United States Patent
Busaba et al.

(10) Patent No.: US 7,167,968 B2
(45) Date of Patent: Jan. 23, 2007

(54) STORAGE PRE-ALIGNMENT AND EBCDIC, ASCII AND UNICODE BASIC LATIN CONVERSIONS FOR PACKED DECIMAL DATA

(75) Inventors: Fadi Y. Busaba, Poughkeepsie, NY (US); Steven R. Carlough, Poughkeepsie, NY (US); Mark A. Check, Hopewell Junction, NY (US); Christopher A. Krygowski, Lagrangeville, NY (US); John G. Rell, Jr., Saugerties, NY (US); Frank Tanzi, Fishkill, NY (US)

(73) Assignee: International Business Machines Corporation, Armonk, NY (US)

( * ) Notice: Subject to any disclaimer, the term of this patent is extended or adjusted under 35 U.S.C. 154(b) by 401 days.

(21) Appl. No.: 10/834,637

(22) Filed: Apr. 29, 2004

(65) Prior Publication Data

US 2005/0246507 A1   Nov. 3, 2005

(51) Int. Cl.
*G06F 12/06* (2006.01)
(52) U.S. Cl. .................................................. 711/201
(58) Field of Classification Search ................ 711/201; 341/51, 62, 84, 85
See application file for complete search history.

(56) References Cited

U.S. PATENT DOCUMENTS

| | | | | |
|---|---|---|---|---|
| 5,276,891 A | * | 1/1994 | Patel | .......................... 712/300 |
| 5,737,735 A | * | 4/1998 | Soeder | .......................... 707/6 |
| 5,751,623 A | * | 5/1998 | Ferguson | .................... 708/683 |
| 6,557,096 B1 | * | 4/2003 | Ganapathy et al. | ......... 712/221 |
| 6,658,625 B1 | * | 12/2003 | Allen | ........................ 715/523 |

* cited by examiner

Primary Examiner—Kevin L. Ellis
(74) Attorney, Agent, or Firm—Lynn L. Augspurger

(57) ABSTRACT

A method of pre-aligning data for storage during instruction execution improves performance by eliminating the cycles otherwise required for data alignment. The method can convert data between ASCII and Packed Decimal format, and between Unicode Basic Latin and Packed Decimal format. Conversion to Packed Decimal format is needed for decimal hardware in a microprocessor designed to generate decimal results. Converting from Packed Decimal to ASCII and Unicode Basic Latin is necessary to report Decimal Arithmetic results in a required format for the application program. To further improve performance, all available write ports in the fixed point unit (FXU) are utilized to reduce the number of cycles necessary to store results. To prevent data fetching of the unused destination data from slowing down instruction execution, the destination locations are tested for storage access exceptions, but the data for these operands are not actually fetched. A single read request from the FXU to the operand buffers effectively reads the entire destination address (up to 8 double-words of data) in a single cycle.

20 Claims, 3 Drawing Sheets

STORAGE PRE-ALIGNMENT AND EBCDIC, ASCII AND UNICODE BASIC LATIN CONVERSIONS FOR PACKED DECIMAL DATA

TRADEMARKS

IBM® is a registered trademark of International Business Machines Corporation, Armonk, N.Y., U.S.A. ESAME, S/390, zSeries, Z900 and z990 and other names used herein may be registered trademarks, trademarks or product names of International Business Machines Corporation or other companies.

BACKGROUND OF THE INVENTION

1. Field of the Invention

This invention relates to computer systems, and particularly to storage-pre-alignment and conversions for Packed Decimal formatted data of data coded according to the EBCDIC, ASCII and Unicode Basic Latin standard formats.

2. Description of Background

For computer architectures such as IBM's Enterprise Systems Architecture Modal Extensions (ESAME), main memory storage is byte addressable, requiring the results of an operation to be byte aligned and merged with storage data before it can be written to memory. In a high frequency pipelined processor design there isn't enough time to transmit results from the execution unit to the data cache, align it, and merge it for storage in a single cycle. Adding a separate stage for alignment can adversely effect performance, particularly if alignment is not necessary for many of the operations (results are double-word aligned with storage). Therefore, the alignment process often occurs during instruction execution. For multi-cycle operations this often means the instruction will require at least one additional cycle to execute, and may require several additional cycles if it's necessary to align and store multiple double-words of data. Byte alignment for storage is particularly important when working with strings of data such as EBCDIC, ASCII, or Unicode Basic Latin.

Furthermore the performance of arithmetic operations on decimal data stored in these formats are important for commercial workloads.

The Unicode Basic Latin data format consists of two bytes of data for each character. The EBCDIC and ASCII data formats both consists of one byte for each character. When these formats contain numerical data that are to be used as operands for decimal arithmetic, they must first be converted to a packed decimal format, which consists of a sequence of BCD numeric digits followed by a BCD sign digit. Likewise, once the computation on the data has been completed, the results must be converted back into the appropriate data format (EBCDIC, ASCII, or Unicode Basic Latin).

SUMMARY OF THE INVENTION

For ESAME Architecture executed on IBM's s/390 and zSeries mainframes, main memory storage is byte addressable, often requiring the results of an operation to be byte aligned and merged with storage data before it can be written to memory. For multi-cycle operations this often means the instruction will require at least one additional cycle to execute, and may require several additional cycles if it's necessary to align and store multiple double-words of data. This byte alignment for storage is particularly important when working with strings of data such as EBCDIC, ASCII, or Unicode Basic Latin. Furthermore, the performance of arithmetic operations on decimal data stored in these formats are important for commercial workloads.

In accordance with our preferred embodiment, we have provided a method of pre-aligning data for storage during instruction execution which improves performance by eliminating the cycles otherwise required for data alignment. Furthermore a method for converting data between ASCII and Packed Decimal format, and a method for converting data between Unicode Basic Latin and Packed Decimal format is disclosed. Conversion to Packed Decimal is necessary to utilize decimal hardware in the microprocessor for generating decimal results on this data, and converting from Packed Decimal to ASCII and Unicode Basic Latin is necessary to report Decimal Arithmetic results in the required format for the application program.

To further improve performance, all available write ports in the fixed point unit (FXU) (sometimes two on some of IBM's processors) are utilized to reduce the number of cycles necessary to store results. Likewise, although the destination result location is architecturally a source operand for the instruction, this data does not effect the results of the operation. To prevent data fetching of the unused destination address from slowing down instruction execution, the destination locations are tested for storage access exceptions, but the data for these operands are not actually fetched. A single read request from the FXU to the operand buffers effectively reads the entire destination address (up to 8 double-words of data) in a single cycle.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

The capabilities of the present invention can be implemented in software, microcode, firmware, hardware or some combination thereof and the preferred embodiment of our invention encompasses a method of pre-aligning data for storage during instruction execution which improves performance by eliminating the cycles otherwise required for data alignment. Furthermore a method for converting data between ASCII and Packed Decimal format, and a method for converting data between Unicode Basic Latin and Packed Decimal format is disclosed. Conversion to Packed Decimal format is necessary to unitize decimal hardware in the microprocessor for generating decimal results on this data, and converting from Packed Decimal to ASCII and Unicode Basic Latin is necessary to report Decimal Arithmetic results in the required format for the application program.

Memory is byte addressable and each double-word begins with a byte whose memory location is divisible by 16 and ends with a byte whose memory location is 15 greater than the memory location of the first byte, therefore, each double-word is 16 bytes in length. The output buses shown in FIG. 1 as C1bus and C2bus that write to memory are each a double-word in length. Before data can be latched into the C1reg 1E and C2reg 1F registers that drive the C1bus and C2bus result buses respectively, that data must first be byte aligned for storage. Note that it is possible for any result that is longer then a single byte length could possible exist in two different double-words, and thus require multiple storage writes.

Both the C1bus and C2 bus may perform a single storage write each cycle. When a storage write occurs, the data in the C1reg 1E and C2reg 1F are written to a cache or storage under the control of Byte marks. Byte marks are used to indicate what bytes of data on the C1bus and C2bus are to be written to the cache. There are eight bits of Byte marks for each of the two registers, one bit for each byte of the register, where a value of "1" for the bit indicates that the byte it represents is to be written to the cache or storage. The data and byte marks for the C1bus and C2bus result buses are sent to a data cache or storage where the byte mark bits are used to merge the C1bus and C2bus data bytes with the contents of the cache or storage.

Data Conversion

Figure 2:
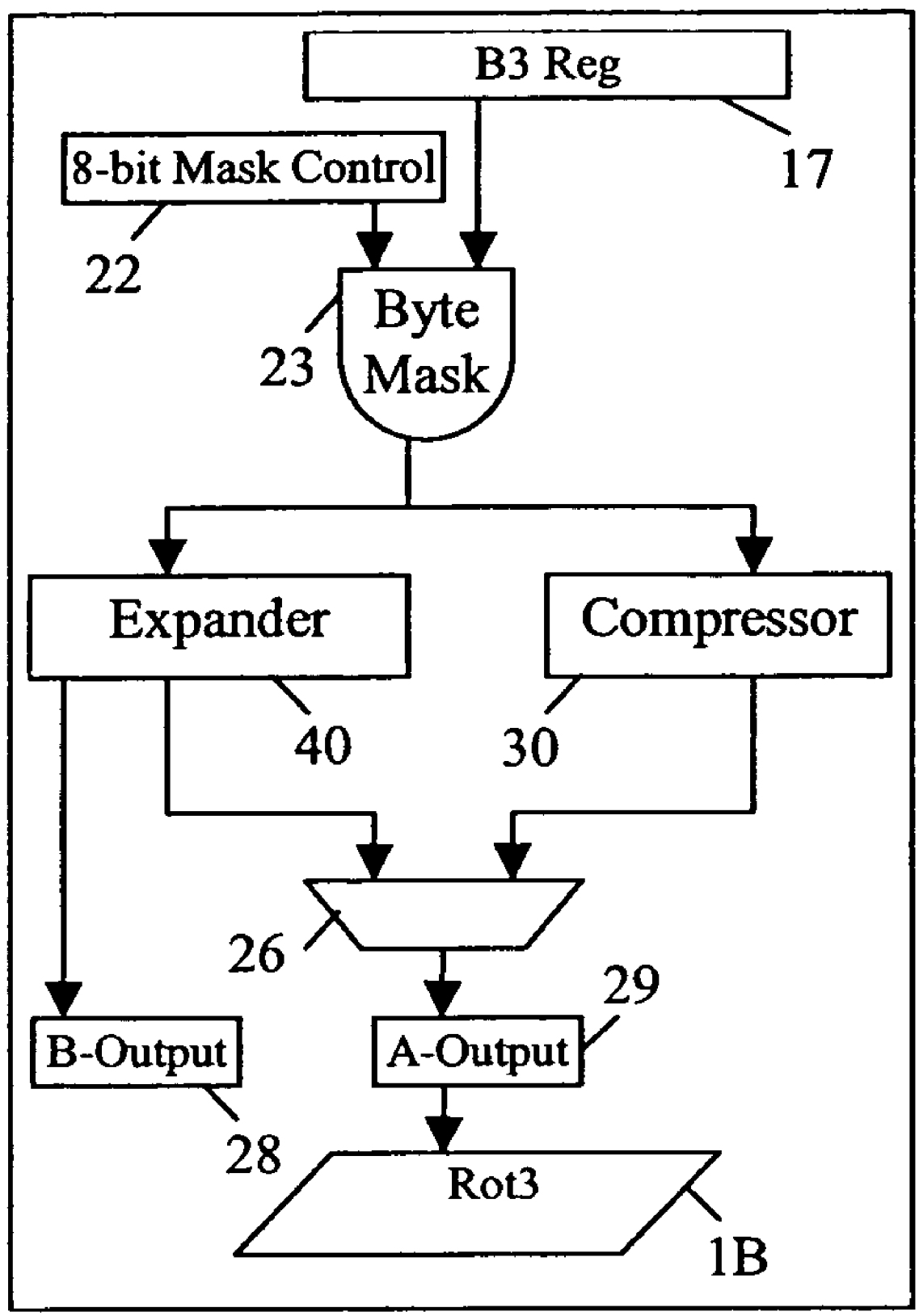
FIG. 2 depicts a data-flow architecture for a data formatter in of an exemplary embodiment.

Referring to FIG. 2, the data formatting process for the conversion operations is discussed. The reformatting process begins with a Byte Mask 23 which is controlled by an 8-bit Mask control 22. The value of the mask control 22 is based on the length of the source operand. Since source data is right aligned and returned from the Operand Buffer 12 in 8 byte blocks, if the source operand is not a multiple of 8 bytes in length, then the unused bytes returned in the most significant double-word must be masked off. After masking the unused bytes from the source operand, the data is sent to the Expander 40 and Compressor 30 process blocks where the data is reformatted based on it's type (EBCDIC, ASCII, or UNICODE). High order Expansion data is sent to the B-output port 28. The A-Output port 29 is used for both Expansion and Compression operations and a multiplexor 26 is used to select the appropriate data for the A-output Port 29 based on the operation that is being executed.

Figure 3:
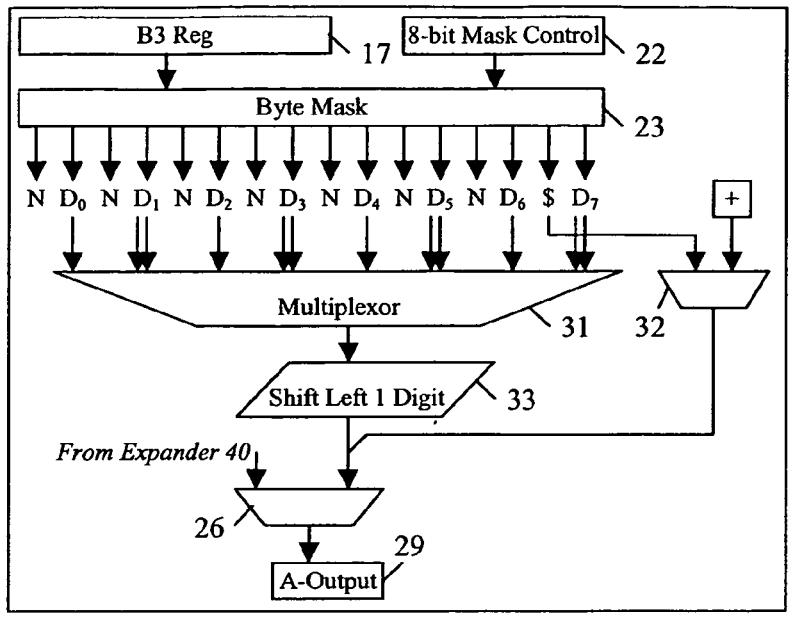
FIG. 3 depicts a data-flow architecture for the hardware necessary for converting EBCDIC, ASCII, and UNICODE data into the packed decimal data format.

Referring to FIG. 3, for compression type operations, Pack ASCII (PKA), Pack Unicode (PKU) and Pack EBCDIC (PACK), the source data passes through the Byte Mask 23 where unused data is masked off the highest order double-word of source data. For PKA, each byte of source data contains a field nibble which is ignored and denoted as "N" (N='0011' if the source data is ASCII numeric data), and a BCD digit denoted as $D_0$ through $D_7$. For PACK operations the source data is the same with the exception that the ignored field "N"='1111' if the data is numeric EBCDIC data, and the least significant byte of the least significant double-word of source data contains a sign digit in the place of the field nibble. For PKU, each half word (two bytes) contain three field nibbles which are ignored (containing the value of '000000000011' for valid UNICODE numerical data) and a BCD digit. A multiplexor 31 selects the BCD data based on whether or not the operation is PKU or PKA and PACK, and shifts it left 1 nibble to make room for the sign nibble necessary in the Packed Decimal format. For PKA and PKU a multiplexor 32 selects a positive sign and appends it to the BCD data that has been left shifted by a digit. For PACK, the sign is set to the value of the field nibble in the least significant byte. If this is not the least significant double word of source data, this sign is still set, but this nibble will be overwritten by the most significant BCD digit from the next double-word of source data, as will be shown below. This Packed Decimal data is selected by the multiplexor 26 that is used to choose between compressor and Expander results, and it is sent to the A-Output port 29 on the data formatter. For PKA and PACK the formatted data leaving on the A-Output port 29 is at most a word plus a nibble (for sign data) and for PKU it at most two bytes of data plus the sign nibble.

Figure 4:
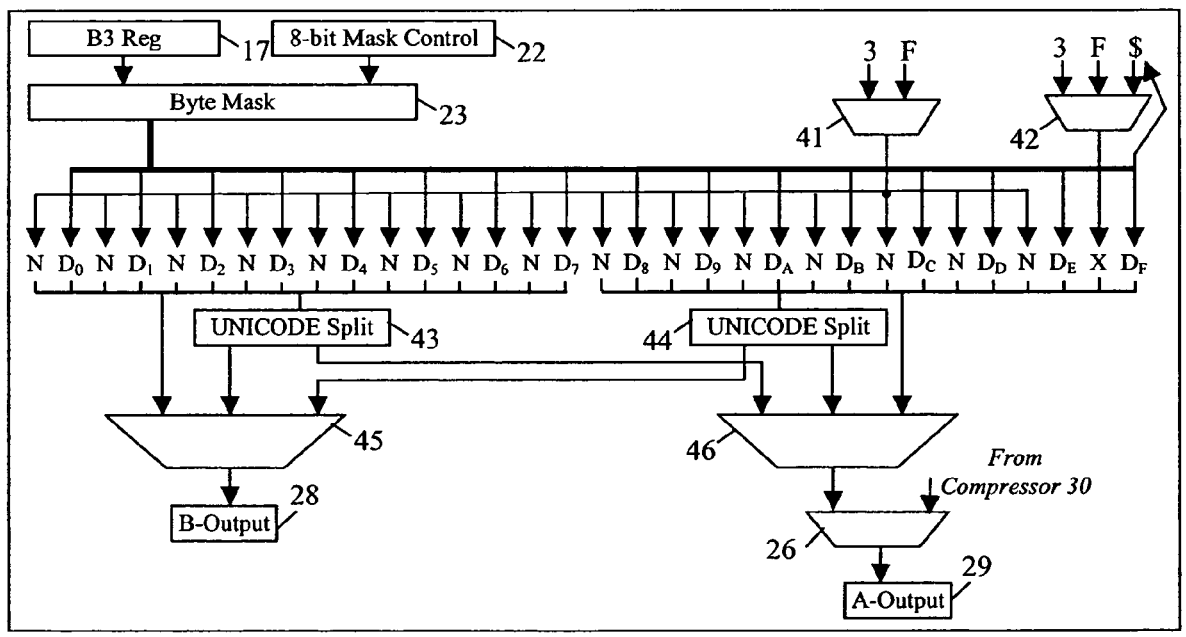
FIG. 4 depicts a data-flow architecture for the hardware necessary for converting packed decimal into the EBCDIC, ASCII, and UNICODE data formats.

Referring to FIG. 4, for expansion type operations, Unpack ASCII (UNPKA), Unpack Unicode (UNPKU) and Unpack EBCDIC (UNPK), the source data passes through the Byte Mask 23 where unused data is masked off the highest order double-word of source data. The source data in the B3reg 17 consists of up to 8 bytes of BCD data where each byte contains two BCD digits if the source is not the least significant double-word. The least significant double-word of source data contains 7 bytes of BCD numeric digits and an eighth byte containing a single BCD digit in the most significant nibble of that byte and a sign digit in the least significant nibble of that byte. Field nibbles "N" are then interleaved between the BCD digits. Multiplexor 41 determines what the value of the field nibble will be based on the operation, '1111' for UNPK and '0011' for UNPKA and UNPKU. Multiplexor 42 is used to set the field nibble for the least significant byte, denoted as "X", and operates the same as multiplexor 41 with the exception that for the least significant double-word of UNPK operations, the nibble is set to the sign digit, denoted as "$" which is contained in the least significant nibble of the source data.

Continuing with FIG. 4, the high order double word of data is sent to multiplexor 45, and the UNICODE Spilt process block 43. The low order double word of data is sent to multiplexor 46 and UNICODE Split process block 44. The UNICODE Spilt process blocks 43 and 44, interleaves a byte containing the value '00002 with each byte of data entering the process block. Therefore, for UNPKU operations, the new field data is effectively set to '000000000011' which is the encoding used to denote UNICODE numeric data. Two double words of data exit the UNICODE Split process blocks 43 and 44, a high order double word that is sent to multiplexor 45 and a low order double-word that is sent to multiplexor 46. For UNPKU operations, each double-word of source data must be processed twice, the first cycle used the quad-word output from process block 43 and the second cycle uses the quad-word output form process block 44. Multiplexors 45 and 46 are used to select which double-word to send to the data formatter output ports 28 and 29.

Storage Pre-alignment

Figure 1:
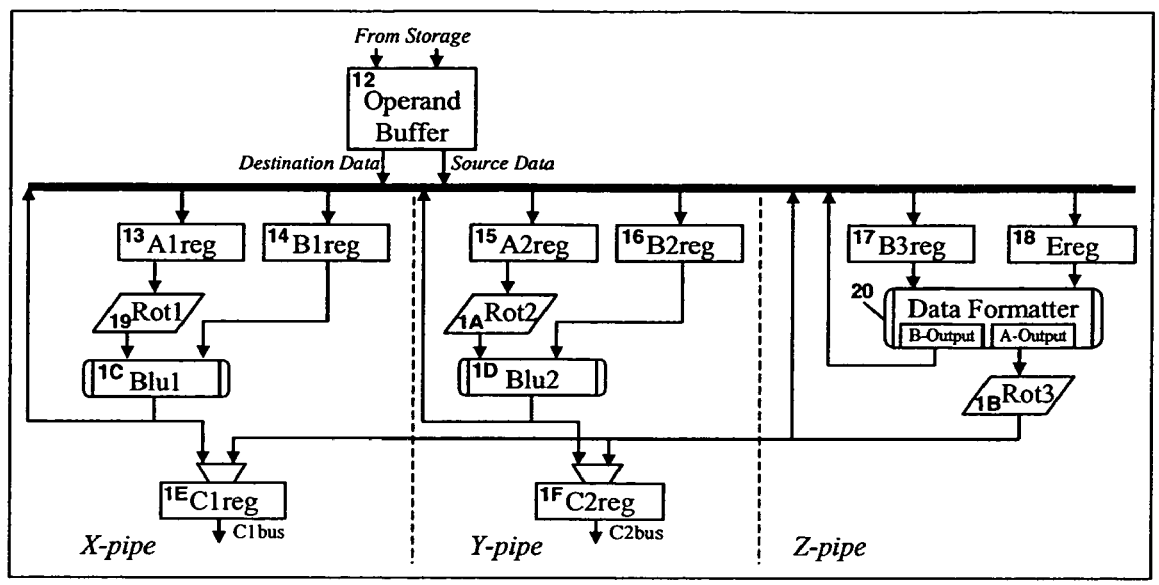
FIG. 1 depicts a hardware architecture and data-flow for a fixed point unit of an exemplary embodiment.

To demonstrate the concept of storage pre-alignment the discussion will begin with an example of Pack EBCDIC (PACK) that can be executed in a single cycle. These instructions can be executed in a single cycle if both the source operand data and the destination operand data is not longer then a single double-word of data. Referring to FIG. 1, the execution of these instructions begin during the E0 setup cycle when the source data is right aligned in the Operand Buffer 12, is sent to the FXU and is latched into the B3reg 17 register. At the same time the FXU determines if the result data will cross a double-word boundary, thereby requiring storage writes. If multiple storage write are necessary, both the C1bus and C2bus driven by C1reg 1E and C2reg 1F respectively will be used. During the execute stage (E1), the source double-word of data (64-bits) is sent through the Data formatter 20, where the data is converted into it's target format (in this case Packed Decimal). The reformatted data is sent through rotator Rot3 1B, where it is aligned for storage. During the Put-away cycle (PA), the result data is latched into both the C1reg 1E and C2reg 1F registers.

Table 1 shows examples of how the result data and byte marks are set for the C1bus and C2bus. For example, suppose the results after the data has been reformatted, but before the data has been rotated for storage is:

xxxxxxxxABCDEFG$, where each letter (A through G) is a variable representing a 4-bit BCD digit and the "$" is a four bit sign digit.

Referring to FIG. 1, during the E1 cycle, DW1 is reformatted in the Data Formatter 20 and rotated in Rot3 1B such that the left most byte is aligned with the left most byte of the storage target address.

At the end of the E1 cycle, the reformatted rotated data is latched into the B1 reg 14 and B2reg 16 registers. If the data is aligned such that the first double-word of data may be stored (i.e. data is aligned within 2 bytes for PKU or 4 bytes for PKA or PACK, then the data is also written to the C1reg 1E for storage). Also during E1, the second double-word of source data (DW2) is latched into B3reg 17.

During the E2 cycle, DW2 is reformatted and rotated with respect to storage and the length of the previously reformatted data. Therefore the reformatted data for the first two double-words align to each other. These results are then latched into the B1reg 14 and B2reg 16 registers. At the same time the data in the B1reg 14 and B2reg 16 registers from the previous cycle is moved to the A1reg 13 and A2reg 15 registers. For PKA and PKU, the third double-word of data is latched into the B3reg 17 register. During the E3 cycle, the data in A1reg 13 and B1reg 14 is merged and sent to C1reg 1E and A1reg 13. Likewise, and data in A2reg 15 and B2reg 16 is merged and sent to C2reg 1F, A2reg 15, and B1reg 14. If the data is C1reg 1E contains a complete double-word of result data (PKU is the only instruction that

TABLE 1

Example of storage pre-alignment for single cycle PACK operations.

| Case | X-Pipe C1bus | Y-Pipe C2bus |
|---|---|---|
| xxxxxxABCDEFG$xx Result contained in a single double-word | C1bus Data:<br>xx xx xx AB CD EF G$ xx<br>C1bus Byte Marks:<br>0 0 0 1 1 1 1 0 | |
| xxxxxxxxxxxxxxAB BCDEFG$xxxxxxxxx Result crosses a double-word boundary | C1bus Data:<br>CD EF G$ xx xx xx xx AB<br>C1bus Byte Marks:<br>0 0 0 0 0 0 0 1 | C2bus Data:<br>CD EF G$ xx xx xx xx AB<br>C2bus Byte Marks:<br>1 1 1 0 0 0 0 0 |

Note there are two different cases represented in Table 1, both of which may be executed in a single cycle. In the first case (row 2 of table 1) the result data is aligned such that it fits into a single double-word of data out in storage. For this case the rotated data is simply sent to the C1reg 1E and the appropriate byte marks are set for storage. For the second case, the data crosses a double word boundary. For this case, the rotated data must be sent to both the C1reg 1E and the C2reg 1F. The C1bus byte marks are set to write data from the beginning byte of the result data to the end of the first double-word, and the C2bus byte marks are set to write the data from the beginning of the second double word to the last byte of the result data. Therefore, both double-words of result data may be written in a single cycle.

For operations requiring multiple cycles of execution, storage pre-alignment is embedded into the execution of the instructions. The discussion will begin with the compression operations PKA, PKU, and PACK. The destination operands for these instructions are two double-words for PKA and PKU, and up to two double-words for PACK instructions. The source operand for these instructions are up to two double-words for PACK, up to four double-words for PKA and up to 8 double-words for PKU.

Similar to the single cycle PACK case discussed above, the first double-word (DW1) of source data is right aligned and latched into the B3reg 17 register during the E0 cycle.

may not, depending on the destination) then the result is stored on the C1bus. Likewise, if C2reg 1F contains all of the data for the second double-word of data (If there were only 2 source double-words), then the data on C2bus is stored. Otherwise, execution continues processing. During each cycle the newly reformatted data is rotated and placed in the B2reg 16 register. The A1reg 13 and B1reg 14 registers are merged and written to A1reg 13 and C1reg 1E, and the A2reg 15 and B2reg 16 registers are merged and written to A2reg 15, B1reg 14, and C2reg 1F. The final results will exist in 1, 2, or 3 double-words, depending on the destination. Endop for the instruction occurs 2 cycles after the last double-word is read into B3reg 17, and the last 2 double-words are always written to storage the cycle after endop. Therefore it is guaranteed that if the results exist in three double-words, the data will be available for writing on the C1bus in one of the cycles prior to endop.

The next set of instructions, UNPK, UNPKA and UNPKU converts the data from Packed Decimal format to EBCDIC, ASCII and Unicode Basic Latin respectively. The source operand for these instructions are two double-words for UNPKA and UNPKU, and up to two double-words for UNPK instructions. The destination operand for these instructions are up to two double-words for UNPK, up to four double-words for UNPKA and up to 8 double-words for UNPKU.

Once the operand data is fetched, the first double-word of data (DW1) is latched into the B3reg 17 register during the E0 stage. During the E1 cycle, DW1 is reformatted, generating a low order double-word result R1A, and a high order double-word result R1B. R1A is loaded into the A1reg 13 and A2reg 15 registers, and R1B is rotated with respect to storage and latched into the B1reg 14 and B2reg 16 registers. If the instruction is UNPK or UNPKA, then the next source operand is latched into the B3reg 17 register. If the instruction is UNPKU then the source operand must be processed for a second cycle, so the contents of B3reg 17 are held.

During the E2 stage the data in A1reg 13 is rotated and merged with B1reg 14 and the data in A2reg 15 is rotated and merged with B2reg 16. The merge results are latched into C1reg 1E, C2reg 1F, and if the destination is not double-word aligned they are also latched in B1reg 14. Likewise, the data in B3reg 17 is reformatted (generating double-words R2A and R2B). R2A is latched into the A1reg 13 and A2reg 15 registers. R2B is rotated for storage then latched into the B2reg 16 register, and if the results are double-word aligned, they are also latched into B1reg 14. For UNPKU instructions the second double-word of source data is latched into the B3reg 17 register. The store request signals for C1bus and C2bus are set.

operand crosses a page boundary) and preparing it for being stored into memory. Even if there were no page crossing, for long UNPKA and UNPKU instructions several extra cycles would be required just to read all of the unused destination operand data.

Pre-alignment for Multiplication and Division

For operations such as decimal multiplication and decimal division, where results must be byte aligned for storage before they can be written to the cache or storage, storage pre-alignment may improve performance.

For decimal multiplication routines the result may be up to 16 Bytes in length including the sign digit. Likewise, for decimal divide instructions, the resulting quotient and remainder may be up to 16 bytes in length including signs for both the quotient and remainder. For divide, the number of quotient digits is equal to the difference in the number of digits between the dividend and the divisor, and the number of remainder digits is equal to the number of digits in the divisor. To demonstrate storage pre-alignment for these instructions, Table 2 shows the last three cycles of a decimal multiplication operation. Variables A-Y represent BCD numeric digits and Z represents a BCD sign digit.

TABLE 2 an example of storage pre-alignment for decimal multiplication.

| | Rot1 | B1reg | Rot2 | B2reg | Dec Addr |
|---|---|---|---|---|---|
| Case 1 | | | | | |
| Cycle 1 | KLMNOPQRST01GHIJ | 1GHIJKLMNOPQRST0 | UVWXYZ00000000 | | 0000000000ABCDEF |
| Cycle 2 | 000000ABCDEF0000 | KLMNOPQRST01GHIJ | YZ00000000UVWX | KLMNOPQRST01GHIJ | |
| Cycle 3 | KLMNOPQRST01GHIJ | YZ00000000UVWX | YZ00000000UVWX | KLMNOPQRST01GHIJ | |
| Case 2 | | | | | |
| Cycle 1 | ST01GHIJKLMNOPQR | 1GHIJKLMNOPQRST0 | UVWXYZ00000000 | | 0000000000ABCDEF |
| Cycle 2 | CDEF000000000AB | ST01GHIJKLMNOPQR | 00UVWXYZ00000000 | ST01GHIJKLMNOPQR | |
| Cycle 3 | ST01GHIJKLMNOPQR | CDEF0000000000AB | 00UVWXYZ00000000 | ST01GHIJKLMNOPQR | |

During the E3 stage the results in the C1reg 1E and C2reg 1F registers are written to the data cache or storage. The data in A1reg 13 is rotated and merged with B1reg 14 and the data in A2reg 15 is rotated and merged with B2reg 16. The merge results are latched into C1reg 1E, C2reg 1F, and if the destination is not double-word aligned they are also latched in B1reg 14. For UNPKU instructions the data in B3reg 17 is reformatted (generating double-words R3A and R3B). R3A is latched into the A1reg 13 and A2reg 15 register and R3B is rotated for storage and latched into the B2reg 16 register. If the destination data is double-word aligned, then the rotated R3B is also latched into the B1reg 14 register. Processing continues in this fashion, storing two double-words of data per cycle until all of the required double-words of destination data have been generated and written to the data-cache or storage. Note that this method allows full utilization of the available bandwidth to the data-cache or storage, writing two double-words every cycle. If it were required to read all of the destination double-words (necessary to release buffers and maintain correct data pointers in the opbuffers) then this would limit the performance of the instruction because it is only possible to read one source operand each cycle. Therefore instruction execution would have to be throttled by the number of destination fetch requests to prevent writing a destination double-word before it has been tested for access exceptions (in the event the Table 2, an example of storage pre-alignment for decimal multiplication.

The two cases described here require result digits from two separate registers and the decimal adder to be merged together, byte aligned, and split across three different double-words. The difference between these two cases is that case 1 requires a merge between two different source registers for the first double word of result data, and Case two requires a merge between two different source registers for the last double-word of result data. Without the use of storage pre-alignment, this process would take five cycles after the final results are computed. By aligning the data for storage before the first merge, two cycles may be removed from the process. Other cases where the result data is only split across two separate double-words, or cases involving data that is coming from only one register and the decimal adder are not illustrated by example. Similar methods, based on those illustrated in the given examples, are used and may be derived from the methods shown in the illustrated examples.

In the first case shown in Table 2, the result data for the most significant digits are generated in the Decimal adder on Cycle 1. At the same time the data in A1reg 13, containing the data for the fourteen next most significant digits, are rotated by Rot1 19 so it is aligned for storage. To determine how far the rotation must be, the starting byte address is added mod16 to the length of the multiplier (the number of significant digits leaving the Decimal Adder on this cycle). The result of this rotation is stored in the B1reg 14 and B2reg 16 for use in cycle 2. On cycle 2, the data from the Decimal adder is aligned for storage, merged with the B1 reg 14 data and latched into the C1 reg 1E. This data will be written to storage or cache under control of the C1bus byte marks via the C1bus on the next cycle. Also during Cycle 2, the data in A2reg 15 is rotated through Rot2 1A to align the least significant digits for storage. On Cycle 3 the digits from B1reg 14 last cycle are moved to A1reg 13 and are fed straight through Rot1 19. The rotated least significant digits from Rot2 1A last cycle are latched into B1reg 14 and A2reg 15. A merge between A1reg 13 and B1reg 14 generate the result digits for the next most 14 significant digits. These digits will be latched into C1reg 1E and written to storage or to the cache on the C1bus next cycle. Likewise the least significant digits in A2reg 15 will be latched to C2reg 1F and will be written under control of the byte masks to cache or storage on the C2bus under control of the byte marks for the C2bus.

In the second case shown in Table 2, the result data for the most significant digits are generated in the Decimal adder on Cycle 1. At the same time the data in A1reg 13, containing the data for the 14 next most significant digits, are rotated by Rot1 19 so it is aligned for storage. The result of this rotation is stored in the B1reg 14 and B2reg 16 for use in cycle 2. On cycle 2, the data from the Decimal adder is aligned for storage latched in the C1reg 1E so the data may be written under control of the byte marks via the C1bus on the next cycle. Also during Cycle 2, the data in A2reg 15 is rotated through Rot2 1A to align the least significant digits for storage. On Cycle 3 the digits from B1reg 14 last cycle are moved to A1reg 13 and are fed straight through Rot1 19. The output of rot1 19 the previous cycle are latched into the B1reg 14. A merge between A1reg 13 and B1reg 14 generate the result digits for the next most 14 significant digits. These digits will be latched into C1reg 1E and written to storage or to the cache on the C1bus next cycle. The B2reg 16 also latches the data for the B1reg 14 on the previous cycle, and a merge between the rot2 1A output (unchanged from the previous cycle) and the B2reg 16 create the data for the least significant double-word of result digits. This data is latched into the C2reg 1F and will be written under control of the byte masks to cache or storage on the C2bus under control of the byte marks for the C2bus.

Storage pre-alignment for decimal Division operations operate similar to that of multiplication operations. Quotient digits stored in the Ereg 18 and A1reg 13 are aligned for storage and merged together while the final remainder is being computed. The remainder is then rotated for storage and merged with the quotient digits while the first double-word of quotient digits are being written to the cache or storage. Both the C1bus and C2bus are then used to write the remaining quotient digits and the remainder digits on the C1bus and C2bus in the final cycle.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for storage pre-alignment of data for storage in a computer system, comprising the steps of:
    preparing data to be written to a memory location for storage prior to being latched into registers that drive the system result bus for writing to a cache or storage under control of byte marks used to merge data bytes with contents of said cache or storage, and in the process of preparing data to be written,
    converting data from Unicode Basic Latin to Packed Decimal format, each byte of source data containing a field nibble and a BCD digit, and during conversion of said source data including a step of stripping out field nibbles from source data bytes and concatenating the remaining BCD digits together.

2. The method according to claim 1, wherein multiple storage buses write data to cache or storage for a single instruction.

3. The method according to claim 1, wherein said process of conversion includes byte aligning and merging of source data for storage during instruction execution.

4. A method according to claim 1, wherein during said process of converting storage destination locations are checked for access exceptions without fetching data to improve performance.

5. A method for storage pre-alignment of data for storage in a computer system, comprising the steps of:
    preparing data to be written to a memory location for storage prior to being latched into registers that drive the system result bus for writing to a cache or storage under control of byte marks used to merge data bytes with contents of said cache or storage, and in the process of preparing data to be written,
    converting data from Packed Decimal format to Unicode Basic Latin, each byte of source data containing a field nibble and a BCD digit, and during conversion of said source data Including a step of splitting apart the BCD digits, pre-pending each digit with the field nibbles, and concatenating the results together.

6. The method according to claim 5, wherein multiple storage buses write data to cache or storage for a single instruction.

7. The method according to claim 5, wherein said process of conversion includes byte aligning and merging of source data for storage during instruction execution.

8. A method according to claim 5, wherein during said process of converting storage destination locations are checked for access exceptions and preparing it for being stored in memory without fetching data to improve performance.

9. A method for storage pre-alignment of data for storage in a computer system, comprising the steps of:
    preparing data to be written to a memory location for storage prior to being latched into registers that drive the system result bus for writing to a cache or storage under control of byte marks used to merge data bytes with contents of said cache or storage, and in the process of preparing data to be written,
    converting data from ASCII to Packed Decimal format, each byte of source data containing a field nibble and a BCD digit, and during conversion of said source data including a step of stripping out the field nibbles and concatenating the remaining BCD digits together.

10. The method according to claim 9, wherein multiple storage buses write data to cache or storage for a single instruction.

11. The method according to claim 9, wherein said process of conversion includes byte aligning and merging of source data for storage during instruction execution.

12. A method according to claim 9, wherein during said process of converting storage destination locations are checked for access exceptions and preparing it for being stored in memory without fetching data to improve performance.

13. A method for storage pre-alignment of data for storage in a computer system, comprising the steps of:
preparing data to be written to a memory location for storage prior to being latched into registers that drive the system result bus for writing to a cache or storage under control of byte marks used to merge data bytes with contents of said cache or storage, and in the process of preparing data to be written,
converting data from Packed Decimal format to ASCII, each byte of source data containing a field nibble and a BCD digit, and during conversion of said source data including a step of splitting apart the BCD digits, pre-pending each digit with the field nibbles, and concatenating the results together.

14. The method according to claim 13, wherein multiple storage buses write data to cache or storage for a single instruction.

15. The method according to claim 13, wherein said process of conversion includes byte aligning and merging of source data for storage during instruction execution.

16. A method according to claim 13, wherein during said process of converting storage destination locations are checked for access exceptions and preparing it for being stored in memory without fetching data to improve performance.

17. A data formatter, comprising:
a data register for aligned source data,
an 8-bit mask control;
a byte mask controlled by a mask control value of said mask control based on the length of a source operand, output date of said byte mask's output being coupled to an expander and a compressor where data is reformatted based on its type, with high order expansion data outputting said expander being sent to a coupled expander output port and Low order expansion data being sent to a multiplexor along with compression operation data from said compressor, said multiplexor being provided with an multiplexor output for receiving data from both expansion and compression operations of said expander and compressor, said multiplexor selecting the appropriate data based upon an operation that is being executed.

18. A data formatter, comprising:
a converter apparatus for compression operations for data formats selected from a group of Pack ASCII (PKA), Pack Unicode (PKU) and Pack EBCDIC (PACK) data formats for generating packed decimal data (BCD) format from said selected data formats, said converter apparatus having a data register for aligned source data, an 8-bit mask control,'
a byte mask controlled by a mask control value of said mask control based on the length of a source operand, said source data passing through said byte masks where unused data is masked off the highest order double-word of source data, the output of said mask being coupled to a selection multiplexor which selects packed decimal data based on whether or not the operation is for a PKU, PKA or PACK and shifts it a nibble to make room for a sign nibble used in the packed decimal (BCD) format, said shifted data being outputted after shifting to an expander and compressor multiplexor used to choose between compressor and expander results, said results being sent to an output of said data formatter.

19. A data formatter, comprising:
a converter apparatus for expansion operations for data formats selected from a group of unPack ASCII (UN-PKA), unPack Unicode (UNPKU) and unPack EBCDIC (UNPK) data formats for generating packed decimal data (BCD) format from said selected data formats, said converter apparatus having a data register for aligned source data,
an 8-bit mask control;
a byte mask controlled by a mask control value of said mask control based on the length of a source operand, said source data passing through said byte masks where unused data is masked off the highest order double-word of source data, said source data in said data register having up to 8 bytes of BCD data where each byte contains two BCD digits if the source is not the least significant double-word, the least significant double-word of said source data contains 7 bytes of BCD numeric digits and an eighth byte containing a single BCD digit in the most significant nibble of that byte and a sign digit in the least significant nibble of that byte, and wherein field nibbles are then interleaved between the BCD digits based upon a coupled selection multiplexor which determines the value of the field nibble based upon the operation for unPKU, unPKA or unPACK, and a field nibble multiplexor being used to set the field nibble for the least significant bit and providing a sign digit in the least significant nibble of the source data, said expanded data being outputted to an expander and compressor multiplexor which outputs the results to an output of said data formatter.

20. The data formatter according to claim 19 wherein there is provided a high order multiplexor with a first UNICODE split process block, a low order multiplexor with a second UNICODE split process block, said first and second split process blocks interleaving a byte containing the value '0000' with each byte of data entering the process block to provide for unpku operations a field of data used to denote UNICODE numeric data.

* * * * *